United States Patent
Moreaux et al.

(10) Patent No.: US 8,180,992 B2
(45) Date of Patent: May 15, 2012

(54) METHOD FOR CONFIGURING A MEMORY SPACE DIVIDED INTO MEMORY BANKS

(75) Inventors: Christophe Moreaux, Simiane (FR);
Ahmed Kari, Aix en Provence (FR);
David Naura, Aix en Provence (FR);
Pierre Rizzo, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 1008 days.

(21) Appl. No.: 12/036,667

(22) Filed: Feb. 25, 2008

(65) Prior Publication Data
US 2008/0209155 A1 Aug. 28, 2008

Related U.S. Application Data

(63) Continuation-in-part of application No. PCT/FR2006/001768, filed on Jul. 19, 2006.

(30) Foreign Application Priority Data

Aug. 25, 2005 (FR) ........................................ 0508729

(51) Int. Cl.
*G06F 12/06* (2006.01)
(52) U.S. Cl. ........................ 711/173; 711/103; 711/105

(58) Field of Classification Search ................... None
See application file for complete search history.

(56) References Cited

U.S. PATENT DOCUMENTS

| | | | |
|---|---|---|---|
| 5,802,598 A | 9/1998 | Watt | |
| 5,819,061 A | 10/1998 | Glassen et al. | |
| 6,560,686 B1 * | 5/2003 | Nishida | 711/173 |
| 2002/0144103 A1 * | 10/2002 | Kendall | 713/1 |
| 2002/0161962 A1 * | 10/2002 | Furuyama et al. | 711/103 |
| 2003/0026130 A1 * | 2/2003 | Fasoli | 365/185.11 |
| 2003/0179637 A1 * | 9/2003 | Elzur et al. | 365/230.03 |
| 2004/0165468 A1 * | 8/2004 | Johnson | 365/230.03 |
| 2005/0281095 A1 * | 12/2005 | Eilert et al. | 365/189.12 |
| 2006/0161725 A1 * | 7/2006 | Lee et al. | 711/103 |
| 2007/0061499 A1 * | 3/2007 | Rudelic | 711/103 |

FOREIGN PATENT DOCUMENTS

EP 0657818 A1 6/1995

* cited by examiner

*Primary Examiner* — Kaushikkumar Patel
(74) *Attorney, Agent, or Firm* — Seed IP Law Group PLLC

(57) ABSTRACT

A method for configuring a memory space, the method including reading a piece of configuration information in the memory space, determining a division of at least one part of the memory space into memory banks according to the configuration information read; and allocating to each of the memory banks an access number to be used to access a data location in the memory bank, in combination with a logic address of the location in the memory bank.

12 Claims, 2 Drawing Sheets

METHOD FOR CONFIGURING A MEMORY SPACE DIVIDED INTO MEMORY BANKS

BACKGROUND

1. Technical Field

The present disclosure relates to integrated circuits having a processing unit and a memory space and, more particularly, to one or more memories addressable by the processing unit and to a method of configuring the same.

2. Description of the Related Art

In particular, the present disclosure relates to Radio-Frequency Identification (RFID) tags. Such tags generally include send and receive circuits for sending and receiving modulated radioelectric signals to exchange data with a reader, an electric power supply circuit to generate a supply voltage of the integrated circuit using radioelectric signals received, a processing unit, and a memory space having a non-volatile memory, of the EEPROM type for example.

In certain applications, the memory space of such a tag is divided into memory banks, each reserved for specific functions. Each of the memory banks is associated with an access number to be used to access a data location in the memory bank in combination with a logic address of the location in the memory bank.

When a certain level of security is required, the memory banks can be individually read- or write-locked, made inaccessible. This arrangement enables various people to intervene separately in the process of manufacturing, customizing, adapting to a specific application and using the chip, while providing protection against fraudulent operations.

The mode for addressing the memory space by memory banks involves a specific address decoding to convert a logic address associated with a memory bank number into a physical address capable of being processed by the memory. Indeed, such a decoding depends both on the number of memory banks, on the position, and on the size of each one of them. Now, for reasons relating to cost saving and speed of execution, the address decoding is generally performed by hard-wired logic. The result is that the configuration of the memory space of a tag is generally set.

BRIEF SUMMARY

The embodiments of the present disclosure make the memory space of an integrated circuit configurable according to a dynamically modifiable piece of configuration information.

In accordance with one embodiment, a method for configuring a memory space is provided, the method including the steps of defining memory banks in the memory space, and of allocating an access number to each memory bank, the access number being intended to be used to address a data location in the memory bank, in combination with a logic address of the location in the memory bank.

According to the present disclosure, the method includes the steps of reading a piece of configuration information in the memory space, and of determining a division of at least one part of the memory space into memory banks according to the configuration information.

According to one embodiment of the present disclosure, the method includes a step of determining a configuration parameter for configuring the memory space according to the configuration information, the configuration parameter being used to determine a physical address of a location to be accessed in the memory space, according to a memory bank number and a logic address of the location in the memory bank.

According to one embodiment of the present disclosure, the configuration information defines the size and/or the position of a memory bank and is stored in the memory bank.

According to one embodiment of the present disclosure, the configuration information defines the size of at least one memory bank, the configuration parameter resulting from a comparison of the size of the memory bank with a threshold value.

According to one embodiment of the present disclosure, the configuration parameter indicates whether a region of the memory space includes one or two memory banks.

The present disclosure also relates to a method for accessing a location in a memory space including memory banks, each of the memory banks associated with an access number, the access method including a step of receiving a memory bank number and a logic address of a location to be accessed in the memory bank corresponding to the memory bank number received.

According to the present disclosure, the memory space is configured in accordance with the configuration method defined above, the access method including steps of:
 checking, according to the configuration information, whether the received memory bank number exists,
 if the memory bank number exists, checking, according to the configuration information, whether the logic address received belongs to the memory bank corresponding to the memory bank number received, and
 if the logic address of the location belongs to the memory bank, determining the physical address of the location in the memory space according to the memory bank number, to the logic address of the location in the memory bank and to the configuration information, and accessing the location.

According to one embodiment of the present disclosure, the access method includes the steps of reading in a memory bank a locking parameter for locking a memory bank to be accessed, and of accessing a location in the memory bank accessed only if the latter is not locked.

The present disclosure also relates to a device for accessing a memory space having memory banks, each of the memory banks associated with an access number to be used to access a data location in the memory bank, in combination with a logic address of the location in the memory bank.

According to the present disclosure, the access device includes means for reading a piece of configuration information stored in the memory space, and means for determining a division of at least one part of the memory space into memory banks according to the configuration information.

According to one embodiment of the present disclosure, the access device includes means for determining a configuration parameter for configuring the memory space according to the configuration information, the configuration parameter used to determine a physical address of a location to be accessed in the memory space, according to a memory bank number and a logic address of the location in the memory bank.

According to one embodiment of the present disclosure, the access device includes:
 a circuit for checking, according to the configuration information, whether a received memory bank number exists,
 a circuit for checking, according to the configuration information, whether a logic address received belongs to the memory bank corresponding to a memory bank number received, and a circuit for determining a physical address of a location in the memory space according to a memory bank number, a logic address of the location in the memory bank and the configuration information.

According to one embodiment of the present disclosure, the access device includes means for reading in the memory space locking information for locking the memory banks and means for accessing a location in a memory bank only if the memory bank is not locked according to the locking information.

The present disclosure also relates to an integrated circuit having an access device as defined above.

According to one embodiment of the present disclosure, the integrated circuit includes send and receive circuits for sending and receiving modulated radioelectric signals, an electric power supply circuit for generating a supply voltage of the integrated circuit using radioelectric signals received, a processing unit, and a memory space having a non-volatile memory divided into memory banks.

In accordance with another embodiment of the present disclosure, a method for use with a configurable memory having a plurality of memory banks is provided, the method including initializing the memory to select a configuration of the memory banks, receiving a memory bank number and a logic address, and testing the memory bank number and the logic address to determine the existence of the memory bank number and the logic address in the memory, and determining a physical address to be addressed when the memory bank number and the logic address are confirmed to be in existence in the memory.

In accordance with another aspect of the foregoing embodiment, the method includes sending an addressing error signal if one or the other or both of the memory bank number and the logic address are determined to not be in existence.

In accordance with another aspect of the foregoing embodiment, the initialization step includes reading the size of a selected memory bank, comparing the size of a selected memory bank with a threshold value, selecting a configuration of the memory bank in correspondence to the outcome of comparing the size of the memory bank with the threshold value.

In accordance with yet another aspect of the foregoing embodiment, the method includes selecting another configuration of a memory bank, including writing a different size value in a field reserved for a size of the selected memory bank and to trigger the initialization procedure to implement the new size value.

BRIEF DESCRIPTION OF THE SEVERAL VIEWS OF THE DRAWINGS

These and other advantages and features of the present disclosure shall be presented in greater detail in the following description of preferred embodiments of the present disclosure, given in relation with, but not limited to, the following figures.

DETAILED DESCRIPTION

Figure 1:
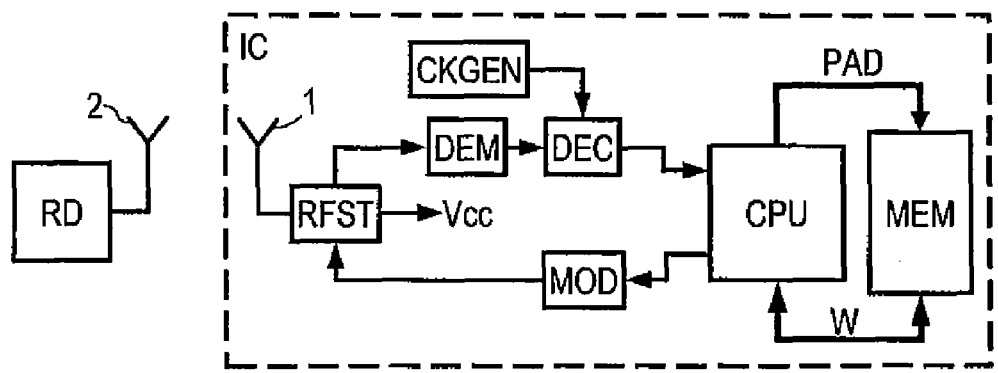
FIG. 1 represents an RFID tag-type integrated circuit in block form.

FIG. 1 represents an integrated circuit IC that includes a processing unit CPU coupled to a memory MEM. The processing unit communicates with an external reader RD coupled to an antenna 2, using an antenna 1 connected to a radio-frequency stage RFST. The stage RFST is connected to a demodulator DEM and to a modulator MOD. The demodulator is connected to a decoder DEC that supplies the processing unit CPU with data received and demodulated. The modulator modulates data supplied by the processing unit and applies the modulated data to the stage RFST with a view of sending the same to the reader RD, typically by passive backscatter modulation, although active transmission can be used.

Furthermore, the stage RFST produces a direct voltage Vcc to supply the integrated circuit IC, using a radioelectric field or radio frequency radiated by the reader RD. In other words, the tag shown in FIG. 1 is a passive tag that relies on power extracted from the received signal. The integrated circuit IC also includes a clock signal generator CKGEN that paces the decoder DEC.

Data transmission between the integrated circuit IC and the reader RD is for example performed using ASK (Amplitude Shift Keying) or a PSK (Phase Shift Keying) modulation. The demodulator DEM supplies the decoder with a signal, the form of which corresponds to the envelope of the signal received. The decoder samples this signal to obtain a binary signal containing the data received.

The processing unit CPU is for example produced in hardwired logic. The memory MEM is for example an EEPROM-type (Electrically Erasable Programmable Read Only Memory) memory with a single sense amplifier. The processing unit is connected to the memory by address and data buses, whereby the transmission of a physical address PAD to be accessed and a word W to be stored or which is read in the memory at the physical address is possible.

Figure 2:
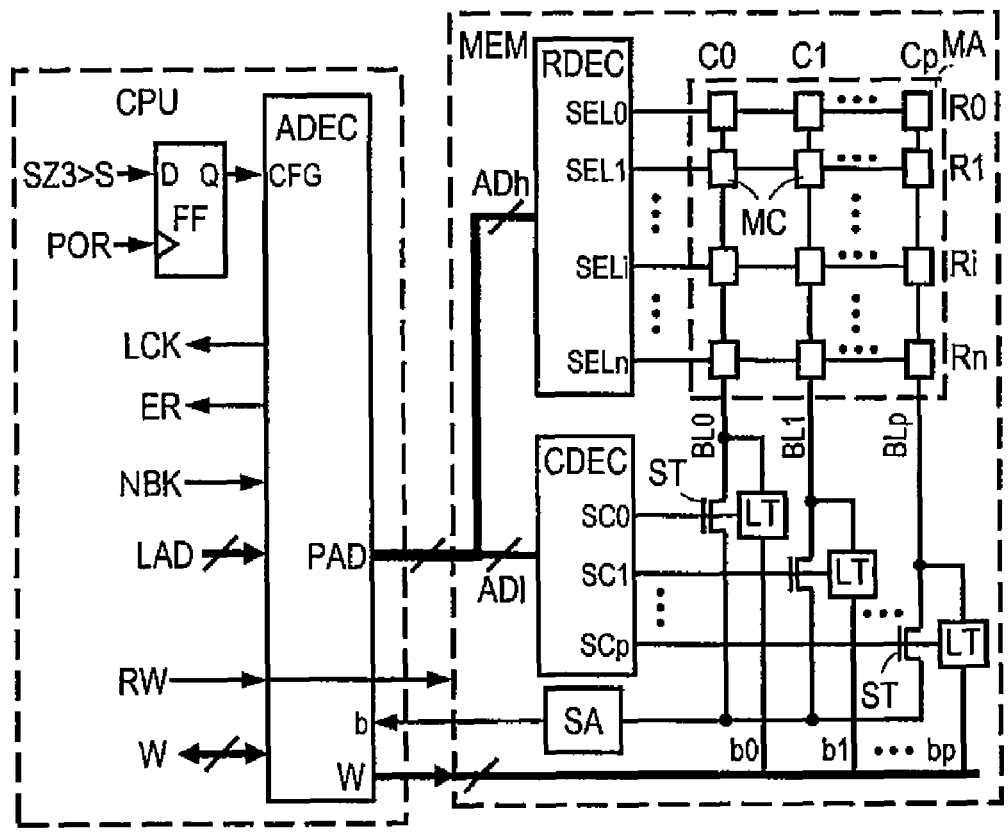
FIG. 2 represents in block form an address decoding device coupled to a memory of the integrated circuit shown in FIG. 1.

FIG. 2 represents the memory MEM and an address decoding function ADEC of the processing unit CPU. In this figure, the address decoder ADEC supplies the memory with a physical address PAD of a location to be accessed and a word W to be written and receives from the latter the value of a bit b read in the memory.

The memory includes a memory array MA in which memory cells MC, a line decoder RDEC, a column decoder CDEC and a sense amplifier SA are arranged. The memory stores binary words that can thus only be sequentially read bit-by-bit by the sense amplifier.

The memory cells MC are arranged in the memory array in word lines Ri, i being a whole number between 0 and n. The memory cells are also arranged in bit columns Ck transversal to the word lines, k being a whole number between 0 and p. Thus, each bit column has n+1 memory cells, and each word line, p+1 memory cells.

Each word line Ri comprises a selection line SELi connected to the line decoder RDEC, and to the memory cells of the word line. Each bit column Ck includes a bit line BLk connected to the memory cells MC of the bit column. Each bit line is connected to the drain of a selection transistor ST and to a latch LT. The gate of the selection transistor ST and the latch LT of each column are controlled by the column decoder CDEC through a column selection line SCk. The sources of the transistors ST are connected to the input of the sense amplifier SA.

The most significant bits ADh of a physical address PAD sent by the address decoder ADEC are applied to the line decoder RDEC. The least significant bits ADl of this physical address are applied to the column decoder CDEC. The most significant bits ADh of a physical address enable a word of p+1 bits to be addressed in the memory, while the least significant bits ADl provide access to each of the bits of this word.

A memory cell belonging to the word line Ri and to the bit column Ck is selected by applying predefined voltages to the selection line SELi of the word line, and to the column selection line SCk of the bit column. During programming, a programming voltage is applied by the latches LT to the bit lines BLk corresponding to the bits on 1 of the word W applied at input of the memory, the memory cells of the word line Ri to be programmed being selected. During erasing, an erase voltage is applied to the memory cells to be erased. During reading, the selection of a bit column Ck has the effect of unlocking the transistor ST and thus connecting the bit line BLk connected to the memory cell selected by the selection line SELi to the sense amplifier SA. The output of the sense amplifier SA supplies at output of the memory the value of a bit b stored by the memory cell MC selected, i.e., a binary signal representative of the programmed or erased state of the memory cell.

The address decoder receives from the other functions of the processing unit CPU a memory bank number NBK associated with a logic address LAD, a selection signal for selecting read or write RW in the memory, and if any, a word W to be written in the memory. In response, it supplies a locking state signal LCK, and an access error state signal ER, and possibly a word W that it has reconstituted using the sequential reading of all of the bits forming the word in the memory.

Figure 3:
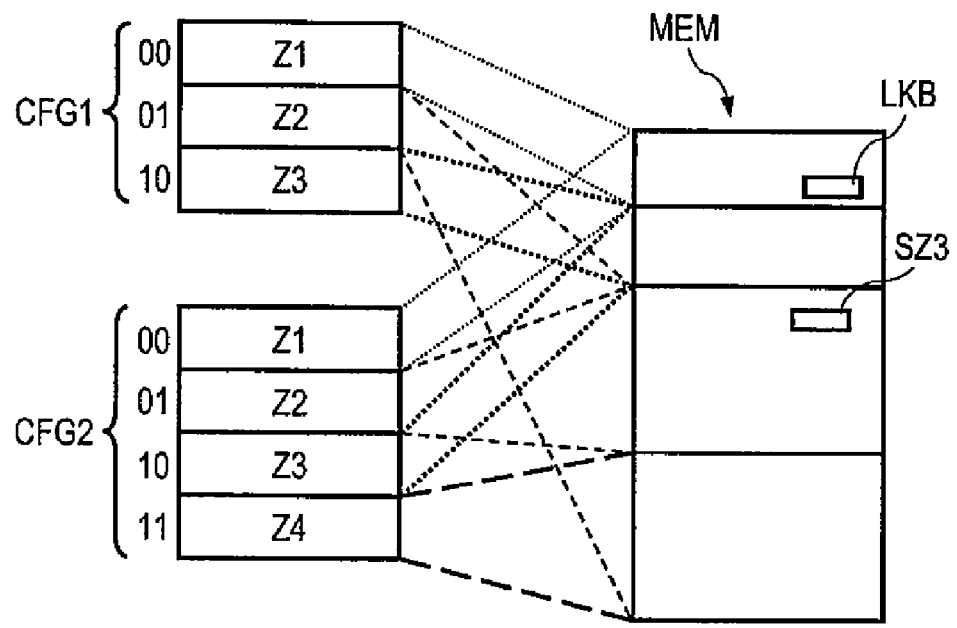
FIG. 3 shows configurations of the memory space of the integrated circuit represented in FIG. 1.

In FIG. 3, the memory MEM is divided into memory banks according to a first configuration CFG1. In the example shown in FIG. 3, the configuration CFG1 defines three memory banks Z1-Z3 in the memory numbered in binary from 00 to 10. The memory banks are not necessarily of the same size. Furthermore, the numbering order of the memory banks does not necessarily correspond to the physical order of the memory banks in the memory. Thus, in the example in FIG. 3, the bank Z3 numbered 10 is situated between the bank Z1 numbered 00 and the bank Z2 numbered 01.

Each memory bank can be individually locked, either read- or write-locked, or both read- and write-locked. If a memory bank is read- or write-locked, then the read or write access thereto from the external environment of the integrated circuit IC is inhibited. The locking state of each memory bank is stored in the form of a locking parameter LKB in one of the banks Z1-Z3, for example in the bank Z1.

A location of the memory MEM is addressed by the processing unit CPU by supplying the address decoder ADEC with a memory bank number NBK associated with a logic address LAD of the location in the memory bank corresponding to the number NBK. Using this memory bank number and this logic address, the address decoder determines the physical address PAD of the location to be accessed in the memory. The address decoder also checks that the memory bank number corresponds to a memory bank existing in the memory MEM and that the logic address is situated in the memory bank defined by the number NBK supplied in association. If the logic address associated with the memory bank number does not correspond to a physical address, the address decoder supplies an error signal ER.

Furthermore, every time a location in a memory bank is accessed, the address decoder reads the locking parameter LKB of the memory area, and supplies the value of this parameter at output as locking state signal LCK. The processing unit CPU can thus check whether the (read or write) access mode is authorized. This access mode is defined by a signal RW applied to the address decoder ADEC and to the memory MEM.

According to the present disclosure, the memory MEM can be divided into memory banks according to other configurations such as the configuration CFG2 shown in FIG. 3. The configuration CFG2 includes four memory banks Z1-Z4 numbered in binary from 00 to 11. The two memory banks Z1 and Z3 of the second configuration CFG2 are identical to the two memory banks Z1 and Z3 of the first configuration CFG1. The bank Z3 in the first configuration is divided into two memory banks Z2, Z4 in the second configuration.

One or the other of these configurations is selected according to a piece of configuration information SZ3 that is stored in the memory bank Z2 in the example in FIG. 3. This configuration information represents for example the size of the memory bank Z2 given in number of words. If the value of this configuration information is greater than a threshold value S, the first configuration CFG1 with three memory banks is selected. In the opposite case, the second configuration CFG2 is selected. The threshold value is for example equal to the half of the region of the memory MEM not occupied by the memory banks Z1 and Z2.

In FIG. 2, the selected configuration CFG is stored by a flip-flop FF receiving at input the result of the comparison of the size SZ3 of the memory bank Z2 with the threshold value S. The Q output of the flip-flop is connected to a configuration input of the address decoder ADEC. The flip-flop is triggered by a Power-On Reset signal POR coming from the integrated circuit IC, applied to a clock signal input. The flip-flop is reset every time the integrated circuit IC is switched off, i.e., when it is placed outside a radioelectric (i.e., radio frequency) field emitted by a reader RD. The result is that a configuration of the memory space is maintained while the value SZ3 is not changed in the bank Z2 and while the integrated circuit is not switched off and switched on again.

One embodiment of the address decoder involves providing an address decoding function for each possible configuration, one or the other of the decoding functions being selected according to the configuration parameter CFG.

Figure 4:
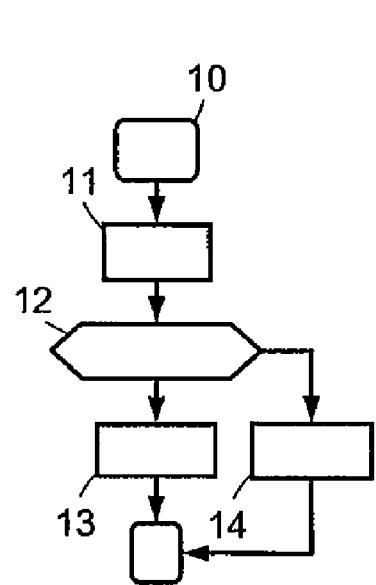
FIG. 4 is a flowchart showing a method of configuring memory spaces, according to the present disclosure.

FIG. 4 shows an initialization procedure 10 of initializing the integrated circuit CI. This procedure includes the following steps:
step 11: reading the size SZ3 of the memory bank Z2,
step 12: comparing the size SZ3 read with the threshold value S,
step 13: selecting the first configuration CFG1, and
step 14: selecting the second configuration CFG2.

When it is initialized, the integrated circuit CI directs the address decoder ADEC to read the size SZ3 of the memory bank Z2 (step 11). In the next step 12, the integrated circuit compares the size read with the threshold value. If the size read is greater than the threshold value, the first configuration CFG1 is selected (step 13). In the opposite case, the second configuration CFG2 is selected (step 14).

To select another configuration, it is sufficient to write another size value in the field reserved for the size of the bank Z2 and to trigger the initialization procedure 10 so that this new value is taken into account.

Figure 5:
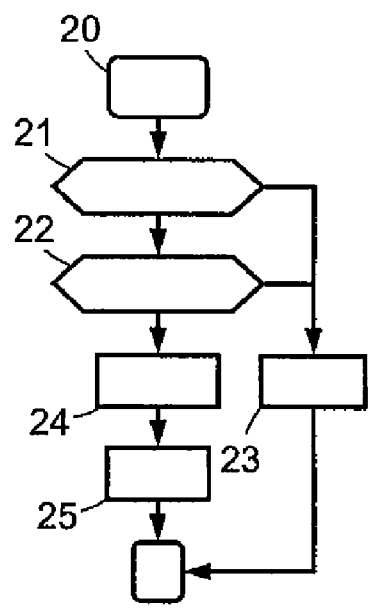
FIG. 5 is a flowchart showing an address decoding method according to the present disclosure.

FIG. 5 shows a procedure 20 of accessing the memory MEM that is executed by the address decoder ADEC upon receiving a memory bank number NBK and a logic address LAD. This procedure includes the following steps:
step 21: testing the existence of the memory bank number NBK received, step 22: testing the existence of the logic address LAD received in the memory bank corresponding to the number received, step 23: sending an addressing error signal ER, step 24: determining the physical address to be accessed, and step 25: accessing the physical address.

In step 21, the address decoder ADEC checks whether the memory bank number NBK received exists, possibly using the configuration parameter CFG that provides an indication about the number of existing memory banks. If the memory bank number received exists, it executes step 22 during which it checks whether the logic address LAD received is situated in the memory bank selected by the number NBK received. For this purpose, it also uses the parameter CFG that can provide an indication about the size of the memory bank.

If, in steps 21 and 22, the number NBK or the logic address LAD received do not correspond to a physical address of the memory MEM, the address decoder indicates an access error ER (step 23). If in step 22, the logic address received exists, the address decoder ADEC performs step 24 during which it determines the physical address PAD to be accessed according to the number NBK, the logic address LAD, and possibly the configuration parameter CFG. For this purpose, it also uses the size of the memory banks situated at the physical addresses below those of the memory bank selected, or the physical address of the beginning of the memory bank selected.

In the next step 25, the address decoder accesses the memory location situated in the memory MEM at the physical address PAD calculated in the previous step, in accordance with the access mode selected by the read or write selection signal RW received.

Before receiving a command to access the memory, the address decoder ADEC can receive a command for reading the locking parameter LKB of a memory bank, associated with a memory bank number NBK, or a read command associated with the number of the memory bank and with the logic address in which the locking parameter is situated.

As a result of these provisions, the configuration of the memory can be changed by a simple modification of a piece of configuration information stored in the memory.

It will be understood by those skilled in the art that various alternatives of the method according to the present disclosure are possible. Thus, the present disclosure is not limited to a selection between two possible configurations. Indeed, a breakdown of the memory MEM varying between one and n memory banks, n being a whole number greater than 2, can be considered. In this case, the configuration information defines the size of n−1 memory banks at the most, the size of certain memory banks possibly being fixed. It shall be noted that in the second configuration CFG2, the respective sizes of the memory banks Z3 and Z4 can vary and be defined for example by the size of the bank Z3, the size of the bank Z4 corresponding to the size of the remaining region of the memory MEM.

The configuration information does not necessarily only define the size of one or more memory banks. It can also define the number of memory banks, and/or the position of one or more memory banks in the memory.

Furthermore, although only one memory is described above, it is possible to consider the memory banks being distributed in several memories forming a memory space.

The present disclosure does not apply to RFID tags only. It applies more generally to any system comprising a processing unit coupled to one or more memories.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for configuring a memory space, comprising:

defining two memory banks in the memory space, and allocating an access number to each memory bank, the access number configured to address a data location in a respective memory bank of the two memory banks in combination with a logic address of the data location in the respective memory bank;

reading configuration information in the memory space, and determining a division of at least one part of the memory space into memory banks according to the configuration information; and determining a configuration parameter for configuring the memory space according to the configuration information, the configuration parameter configured to be used to determine a physical address of the data location to be accessed in the memory space according to the memory bank number and the logic address of the data location in the memory bank.

2. The method of claim 1 wherein the configuration information defines a size or a position of the memory bank or both and is stored in the memory bank.

3. The method of claim 1 wherein the configuration information defines a size of at least one memory bank, the configuration parameter resulting from a comparison of the size of the memory bank with a threshold value.

4. The method of claim 1 wherein the configuration parameter indicates whether a region of the memory space comprises one or two memory banks.

5. A device for accessing a memory space, comprising:

two memory banks, each of the memory banks associated with an access number to be used to access a data location in a respective memory bank in combination with a logic address of the data location in the respective memory bank;

a reading circuit structured to read a piece of configuration information stored in the memory space;

a determining circuit structured to determine a division of at least one part of the memory space into the two memory banks according to the configuration information; and a circuit structured to determine a configuration parameter for configuring the memory space according to the configuration information, the configuration parameter configured to be used to determine a physical address of the data location to be accessed in the memory space, according to a memory bank number and a logic address of the data location in the respective memory bank.

6. The device of claim 5 wherein the configuration information defines a size of a respective memory bank and is stored in the memory space.

7. The device of claim 5 wherein the configuration information defines a size of at least one respective memory bank, and the configuration parameter is determined from a comparison of the size of a memory bank with a threshold value.

8. The device of claim 5 wherein the configuration parameter indicates whether a region of the memory space comprises one or two memory banks.

9. The device of claim 5, comprising:
an address decoder structured to check, according to the configuration information, whether the memory bank number exists, whether the logic address belongs to the respective memory bank corresponding to the memory bank number, and the address decoder further structured to determine a physical address of a location in the memory space according to the memory bank number, the logic address of the location in the respective memory bank, and the configuration information.

10. A method for use with a configurable memory having a plurality of memory banks, the method comprising:
initializing the configurable memory to select a configuration of two memory banks including reading a size of a selected memory bank from the plurality of memory banks comparing the size of the selected memory bank with a threshold value, and selecting a configuration of the selected memory bank in correspondence with an outcome of comparing;
receiving a memory bank number and a logic address and testing the memory bank number and the logic address to determine if the memory bank number and the logic address exits in the configurable memory; and
determining a physical address to be addressed when the memory bank number and the logic address are confirmed to be in existence in the configurable memory.

11. The method of claim 10, comprising sending an addressing error signal if one or the other or both of the memory bank number and the logic address are determined to not be in existence.

12. The method of claim 10, comprising selecting another configuration of the selected memory bank that includes writing a different size value in a field reserved for a size of the selected memory bank and to trigger the initialization procedure to implement the different size value.

* * * * *